(12) United States Patent
Li

(10) Patent No.: US 11,999,297 B2
(45) Date of Patent: Jun. 4, 2024

(54) RECREATIONAL VEHICLE (RV) MONITORING SYSTEM

(71) Applicant: GUANGZHOU CHIXIANG AUTO ACCESSORIES CO., LTD., Guangdong (CN)

(72) Inventor: Huachao Li, Guangdong (CN)

(73) Assignee: GUANGZHOU CHIXIANG AUTO ACCESSORIES CO., LTD., Guangzhou (CN)

( * ) Notice: Subject to any disclaimer, the term of this patent is extended or adjusted under 35 U.S.C. 154(b) by 444 days.

(21) Appl. No.: 17/353,813

(22) Filed: Jun. 22, 2021

(65) Prior Publication Data
US 2022/0219606 A1 Jul. 14, 2022

(30) Foreign Application Priority Data
Jan. 13, 2021 (CN) .......................... 202110041224.7

(51) Int. Cl.
*B60R 1/00* (2022.01)
*B60R 11/04* (2006.01)
*B60R 11/00* (2006.01)

(52) U.S. Cl.
CPC ................ *B60R 1/00* (2013.01); *B60R 11/04* (2013.01); *B60R 2011/004* (2013.01); *B60R 2011/0085* (2013.01); *B60R 2300/105* (2013.01); *B60R 2300/602* (2013.01); *B60R 2300/80* (2013.01)

(58) Field of Classification Search
CPC ..... B60R 11/04; B60R 2300/602; B60R 1/00; B60R 2300/101; B60R 2011/004; B60R 2011/0085; B60R 2300/8066; B60R 2300/802; B60R 1/28; B60R 1/22
See application file for complete search history.

(56) References Cited

U.S. PATENT DOCUMENTS

| | | | | |
|---|---|---|---|---|
| 5,018,397 A * | 5/1991 | Matich | ...................... | G01D 5/00 73/866.5 |
| 5,070,749 A * | 12/1991 | Haviv | ................... | B60B 29/005 81/57.39 |
| 5,351,439 A * | 10/1994 | Takeda | ..................... | E05F 15/41 49/31 |
| 6,105,351 A * | 8/2000 | Itoh | ......................... | A01D 34/90 56/DIG. 17 |
| 6,190,114 B1 * | 2/2001 | Ogawa | ................... | B25J 9/1065 414/744.5 |
| 6,585,201 B1 * | 7/2003 | Reed | ...................... | F16M 13/02 248/917 |
| 8,400,560 B1 * | 3/2013 | Yang | ...................... | H04N 23/51 348/148 |
| 2004/0040482 A1 * | 3/2004 | Fluckiger | ............... | D05B 59/02 112/278 |

(Continued)

*Primary Examiner* — Daniel Chang

(57) ABSTRACT

A recreational vehicle (RV) monitoring system includes a display screen, and a rear-view camera assembly, a side-view camera assembly, a door-top camera assembly, and a reversing camera that are electrically connected to the display screen, where the display screen is detachably disposed inside an RV, the reversing camera is detachably disposed at the tail of the RV, the rear-view camera assembly is mounted at a stop lamp of the RV, the door-top camera assembly is disposed on the top of a door of the RV, and the side-view camera assembly is disposed at a turn lamp of the RV.

8 Claims, 5 Drawing Sheets

(56) References Cited

U.S. PATENT DOCUMENTS

| | | | |
|---|---|---|---|
| 2010/0295316 A1* | 11/2010 | Grassman | H02K 7/183 290/55 |
| 2010/0300421 A1* | 12/2010 | LoRocco | F41B 5/066 206/315.11 |
| 2014/0085467 A1* | 3/2014 | Barthel | B60R 11/04 348/148 |
| 2014/0267743 A1* | 9/2014 | Tapia | G03B 17/08 348/157 |
| 2017/0233062 A1* | 8/2017 | Li | A63H 27/02 416/209 |
| 2017/0233063 A1* | 8/2017 | Zhao | F16B 21/12 403/322.2 |
| 2018/0100342 A1* | 4/2018 | Ikeda | B60J 1/17 |
| 2018/0149949 A1* | 5/2018 | Kim | F16M 11/06 |
| 2018/0249054 A1* | 8/2018 | Chien | F21V 23/0464 |
| 2018/0259976 A1* | 9/2018 | Williams | G05D 1/0027 |
| 2018/0332204 A1* | 11/2018 | Chien | H04N 7/186 |
| 2019/0086950 A1* | 3/2019 | Chen | G06F 1/1601 |
| 2019/0201771 A1* | 7/2019 | Kelley | A63B 71/0619 |
| 2019/0246019 A1* | 8/2019 | Tian | H04N 23/90 |
| 2019/0249468 A1* | 8/2019 | Kim | E05B 81/56 |
| 2020/0236847 A1* | 7/2020 | Nolin | A01D 34/416 |
| 2020/0238952 A1* | 7/2020 | Lindsay | G06V 30/194 |
| 2021/0016720 A1* | 1/2021 | Bai | F16D 11/14 |
| 2021/0031702 A1* | 2/2021 | Luo | B60R 11/0235 |
| 2021/0106115 A1* | 4/2021 | Seguin | A45D 33/16 |
| 2021/0291832 A1* | 9/2021 | Simmons | B60K 35/28 |
| 2021/0347293 A1* | 11/2021 | Zeng | B60Q 1/30 |
| 2022/0076649 A1* | 3/2022 | Griffis | G10G 5/00 |
| 2022/0078317 A1* | 3/2022 | Wang | H04N 23/54 |
| 2022/0136643 A1* | 5/2022 | Tian | F16M 13/022 294/209 |
| 2022/0161616 A1* | 5/2022 | Golgiri | G05D 1/0246 |
| 2022/0212599 A1* | 7/2022 | Gali | B60R 1/26 |
| 2022/0212668 A1* | 7/2022 | Joseph | G06V 20/58 |
| 2022/0215670 A1* | 7/2022 | Gali | G06T 5/92 |
| 2022/0324303 A1* | 10/2022 | Johananoff | B60J 3/026 |

\* cited by examiner

RECREATIONAL VEHICLE (RV) MONITORING SYSTEM

CROSS REFERENCE TO RELATED APPLICATIONS

The present application claims the benefit of Chinese Patent Application No. 202110041224.7 filed on Jan. 13, 2021, the contents of which are incorporated herein by reference in their entirety.

TECHNICAL FIELD

The present disclosure relates to the technical field of recreational vehicles (RVs), and in particular, to an RV monitoring system.

BACKGROUND

With the development of society, an RV is widely applied because it can be used as both a car and a house. Due to its special functions, the RV not only needs to have all kinds of functions of an ordinary car, but also is often used as a house in the open air. During traveling, an owner of the RV will leave for shopping or playing. In this case, the RV is completely in a strange place, full of all kinds of unsafe factors. However, the current RV has poor security monitoring performance, and does not support blind-region monitoring, monitoring at night, or monitoring after parking.

SUMMARY

To resolve the above technical problem, the present disclosure provides an RV monitoring system, to provide functions for blind-region monitoring, monitoring at night, and monitoring after parking, thereby improving safety of an RV.

The technical solution used in the present disclosure to resolve the technical problem thereof is as follows:

A RV monitoring system includes a display screen, and a rear-view camera assembly, a side-view camera assembly, a door-top camera assembly, and a reversing camera that are electrically connected to the display screen, where the display screen is detachably disposed inside an RV, the reversing camera is detachably disposed at a lower end of the tail of the RV, the rear-view camera assembly is mounted at a stop lamp of the RV, the door-top camera assembly is disposed on the top of a door of the RV, and the side-view camera assembly is disposed at a turn lamp of the RV.

Preferably, the door-top camera assembly includes a mounting base, a door-top camera is disposed at an adjustable angle in the middle of the mounting base, and two sides of the door-top camera are respectively provided with a lighting lamp and a sensor for human body detection.

Preferably, the mounting base includes a mounting part and a connecting part for connecting to the door, two adapter plates are symmetrically disposed on the mounting part, two ends of the door-top camera are provided with a spindle, and the spindle is rotatably disposed inside the adapter plate.

Preferably, an included angle between a center line of a lens of the door-top camera and a horizontal plane is a, and a value of a ranges from 25 degrees to 35 degrees.

Preferably, the side-view camera assembly includes a base body, one end of the base body is rotatably provided with a side-view camera, and the other end of the base body is provided with the turn lamp.

Preferably, the base body is provided with a rotating groove, two engaging lugs are oppositely disposed on the rotating groove, two ends of the side-view camera each are provided with a rotating shaft, and the rotating shaft is rotatably disposed inside the engaging lug.

Preferably, the rear-view camera assembly includes a fixed base, one end of the fixed base is rotatably provided with a rear-view camera, and the other end of the fixed base is provided with the stop lamp.

Preferably, the fixed base is provided with two opposite mounting posts, two ends of the rear-view camera each are provided with an adjustment shaft, and the adjustment shaft is rotatably disposed on the mounting post.

Preferably, the RV monitoring system further includes a mounting rack disposed in a cab and a living region of the RV, where the mounting rack is provided with a splicing convex, the display screen is provided with a splicing concave cavity whose shape matches a shape of the splicing convex, and the splicing convex is detachably inserted into the splicing concave cavity.

Preferably, the reversing camera includes a bracket and a camera body, two sides of the camera body are disposed at an adjustable angle on the bracket, and a magnet is disposed at the bottom of the bracket.

Compared with the prior art, the RV monitoring system provided in embodiments of the present disclosure has the following beneficial effects: The rear-view camera assembly is disposed at the stop lamp of the RV, the door-top camera assembly is disposed on the top of the door of the RV, and the side-view camera assembly is disposed at the turn lamp of the RV, so that the RV has a whole-vehicle photographing function, and images obtained by the cameras are displayed and stored by the display screen. In this way, the RV has a blind-region monitoring function, and can monitor a surrounding environment of the RV during driving, at night, and after parking, thereby improving monitoring safety of the RV. In addition, the door-top camera assembly can also photograph a person who approaches the door, and display an obtained image on the display screen to remind an owner of the RV, thereby further improving safety of the RV. The RV monitoring system in the present disclosure has a simple structure and a desired use effect, and can be easily popularized.

Figure 1:
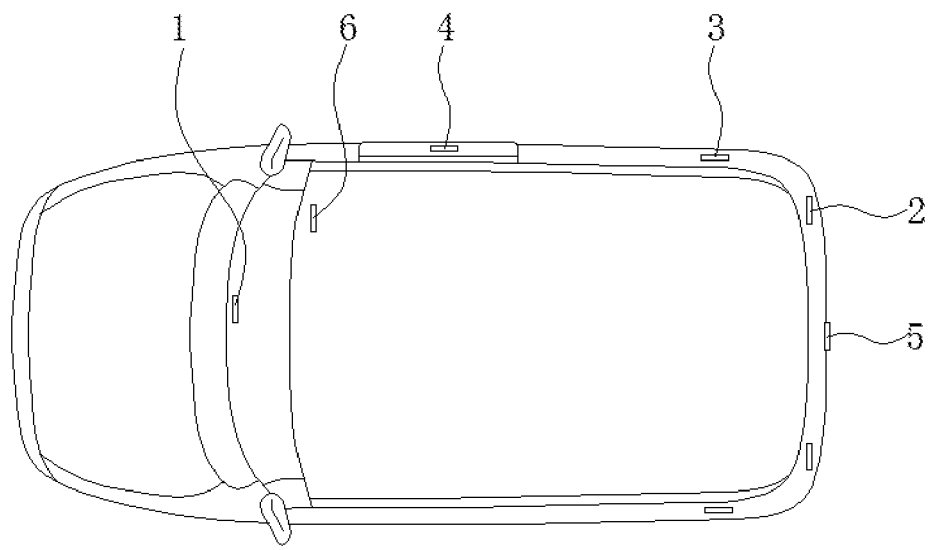
FIG. 1 is a schematic structural diagram of an RV monitoring system according to the present disclosure.

Reference numerals in the figures: 1: display screen; 11: splicing concave cavity; 2: rear-view camera assembly; 21: fixed base; 22: rear-view camera; 23: stop lamp; 24: mounting post; 25: adjustment shaft; 26: first slot; 27: first snap-fit bar; 3: side-view camera assembly; 31: base body; 311: rotating groove; 312: engaging lug; 32: side-view camera; 321: rotating shaft; 33: turn lamp; 4: door-top camera assembly; 41: mounting base; 411: mounting part; 412: connecting part; 42: lighting lamp; 43: sensor; 44: adapter plate; 45: door-top camera; 46: slot; 47: bar; 48: spindle; 5: reversing camera; 51: bracket; 52: camera body; 53: second slot; 54: second snap-fit bar; 6: mounting rack; and 61: splicing convex.

DETAILED DESCRIPTION

Specific implementations of the present disclosure are described in more detail below with reference to the accompanying drawings and embodiments. The following embodiments are intended to illustrate the present disclosure, rather than to limit the scope of the present disclosure.

As shown in FIG. 1, an RV monitoring system according to a preferred embodiment of the present disclosure includes a display screen 1, and a rear-view camera assembly 2, a side-view camera assembly 3, a door-top camera assembly 4, and a reversing camera 5 that are electrically connected to the display screen 1, where the display screen 1 is detachably disposed inside an RV, the reversing camera 5 is detachably disposed at a lower end of the tail of the RV, the rear-view camera assembly 2 is installed at a stop lamp of the RV, the door-top camera assembly 4 is disposed on the top of a door of the RV, and the side-view camera assembly 3 is disposed at a turn lamp of the RV.

In the RV monitoring system based on the above technical features, the rear-view camera assembly 2 is disposed at the stop lamp of the RV, the door-top camera assembly 4 is disposed on the top of the door of the RV, and the side-view camera assembly 3 is disposed at the turn lamp of the RV, so that the RV has a whole-vehicle photographing function, and images obtained by cameras are displayed and stored by the display screen 1. In this way, the RV has a blind-region monitoring function, and can monitor a surrounding environment of the RV during driving, at night, and after parking, thereby improving monitoring safety of the RV. In addition, the door-top camera assembly can also photograph a person who approaches the door, and display an obtained image on the display screen to remind an owner of the RV, thereby further improving safety of the RV. The RV monitoring system in the present disclosure has a simple structure and a desired use effect, and can be easily popularized.

Figure 2:
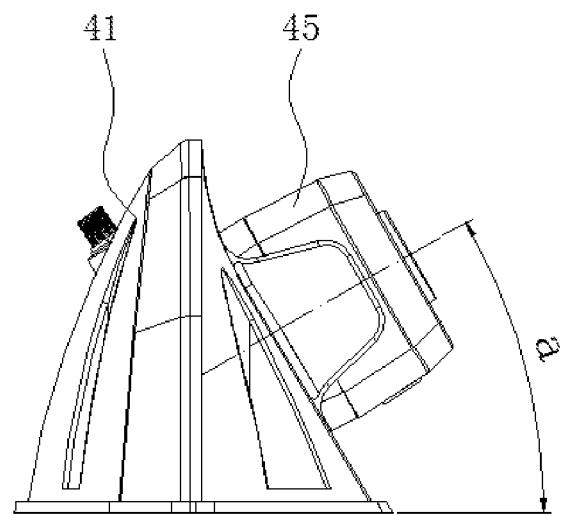
FIG. 2 is a schematic structural diagram of a door-top camera assembly according to the present disclosure.
Figure 3:
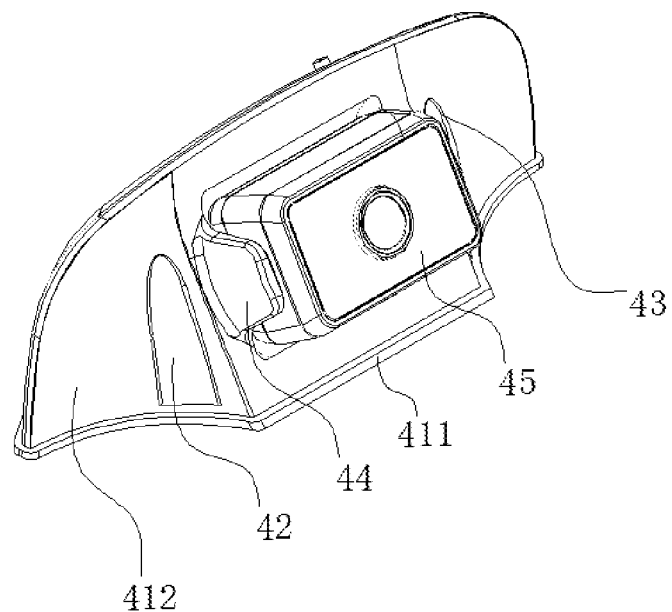
FIG. 3 is an axonometric diagram of a door-top camera assembly according to the present disclosure.
Figure 4:
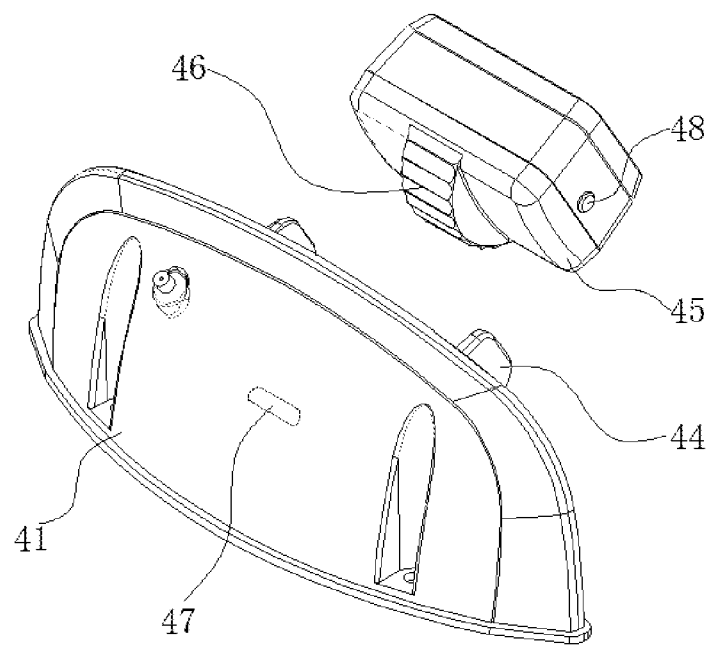
FIG. 4 is an exploded view of a door-top camera assembly according to the present disclosure.

Refer to FIG. 2 to FIG. 4. In this embodiment, the door-top camera assembly 4 includes a mounting base 41, a door-top camera 45 is disposed at an adjustable angle in the middle of the mounting base 41, and two sides of the door-top camera 45 are respectively provided with a lighting lamp 42 and a sensor 43 for human body detection. A white lighting lamp is preferably selected as the lighting lamp 42 to facilitate lighting. A human body induction sensor is preferably selected as the sensor 43. When a person approaches the door at night or during parking, the sensor 43 sends a signal to turn on the lighting lamp 42 to provide lighting, and the door-top camera 45 can photograph the person who approaches the door, and display and store an obtained image by the display screen 1, to reminder the owner and realize monitoring.

In this embodiment, the mounting base 41 includes a mounting part 411 and a connecting part 412 for connecting to the door, two adapter plates 44 are symmetrically disposed on the mounting part 411, two ends of the door-top camera 45 are provided with a spindle 48, and the spindle 48 is rotatably disposed in the adapter plate 44. The connecting part 412 can be directly connected to the door, and this is simple and convenient.

In this embodiment, a back side of the door-top camera 45 is provided with a circular arc snap-fit plate, and the snap-fit plate is provided with a plurality of slots 46. A bar 47 is disposed between the two adapter plates 44 on the mounting part, and the bar 47 is connected to any one of the slots 46 in a snap-fit manner. After the door-top camera assembly 4 is mounted, the door-top camera 45 can be rotated if required, so that the corresponding slot 46 is connected to the bar 47 in the snap-fit manner. This is simple and convenient. However, during adjustment, it needs to be ensured that an included angle between a center line of a lens of the door-top camera 45 and a horizontal plane is a. A value of a ranges from 25 degrees to 35 degrees, and is preferably 30 degrees.

Figure 5:
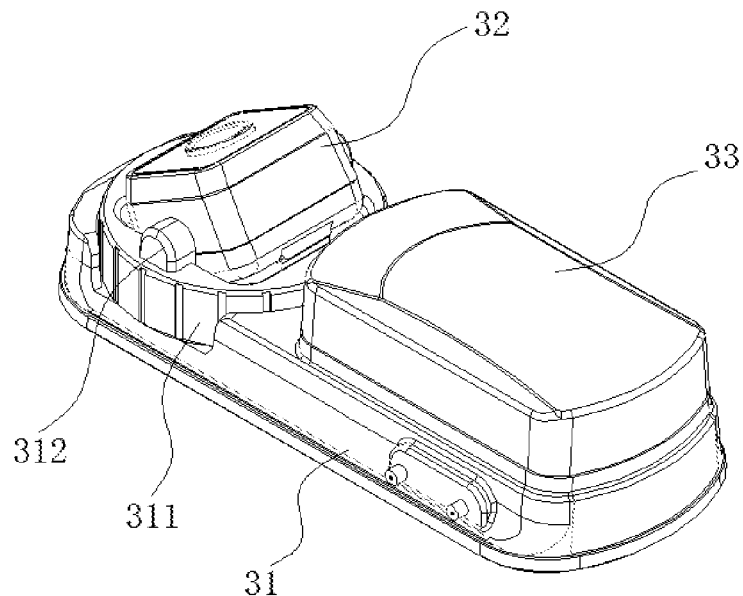
FIG. 5 is a schematic structural diagram of a side-view camera assembly according to the present disclosure.
Figure 6:
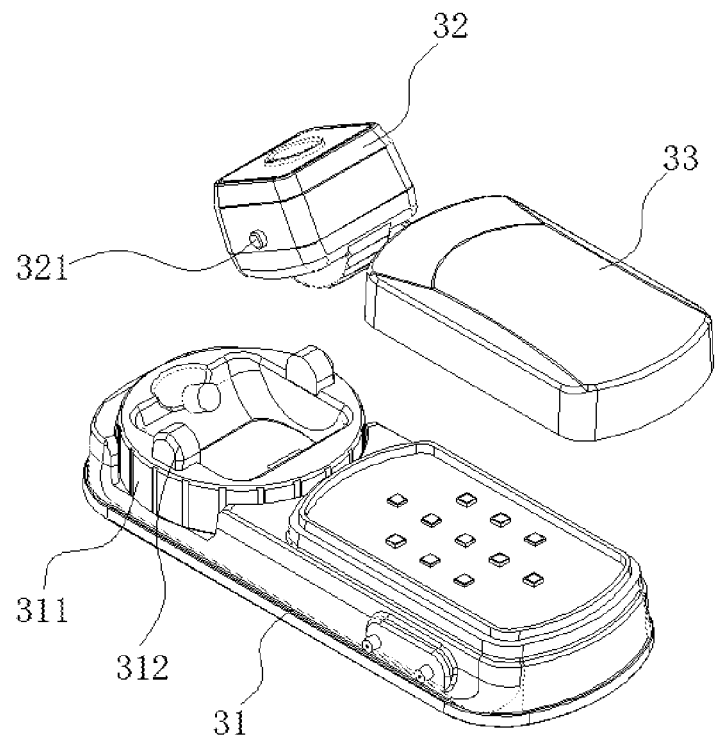
FIG. 6 is an exploded view of a side-view camera assembly according to the present disclosure.

Refer to FIG. 5 and FIG. 6. In this embodiment, the side-view camera assembly 3 includes a base body 31, one end of the base body 31 is rotatably provided with a side-view camera 32, and the other end of the base body 31 is provided with the turn lamp 33. The base body 31 is provided with a rotating groove 311, two engaging lugs 312 are oppositely disposed on the rotating groove 311, two ends of the side-view camera 32 each are provided with a rotating shaft 321, and the rotating shaft 321 is rotatably disposed inside the engaging lug 312. When an angle of the side-view camera 32 needs to be adjusted, only the side-view camera 32 needs to be rotated so that it can rotate around the rotating shaft 321.

Figure 7:
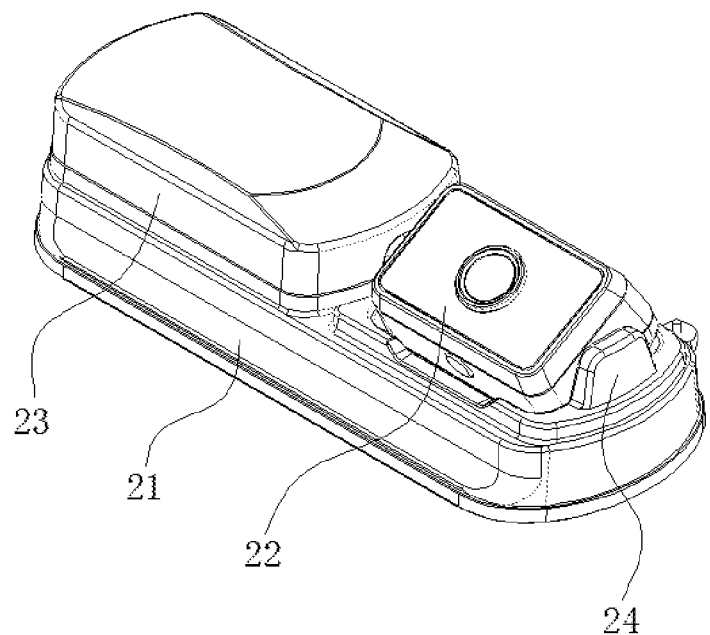
FIG. 7 is a schematic structural diagram of a rear-view camera assembly according to the present disclosure.
Figure 8:
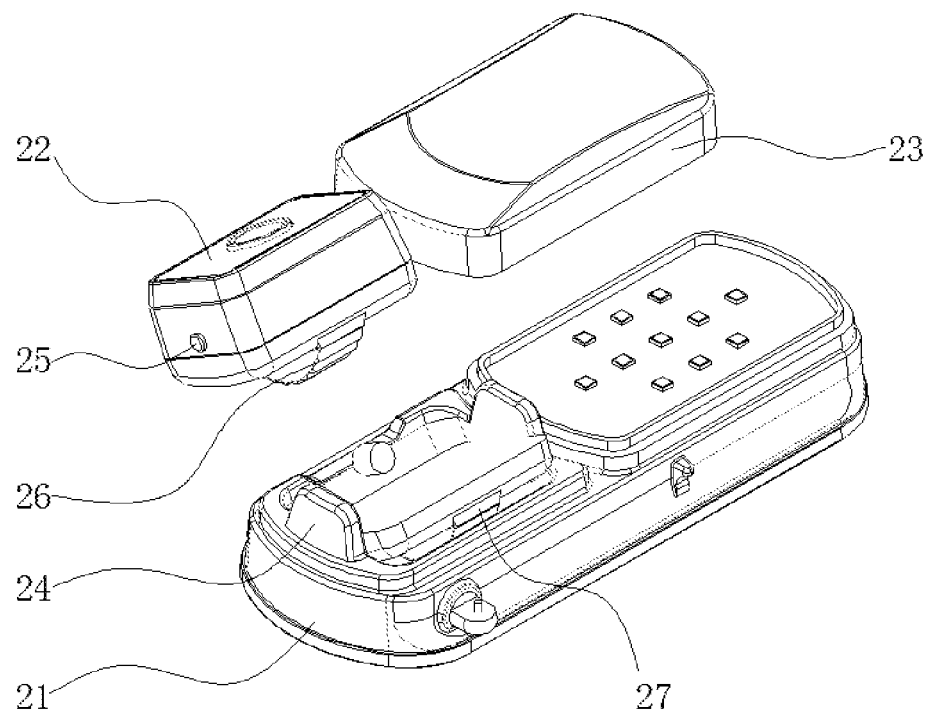
FIG. 8 is a schematic exploded view of a rear-view camera assembly according to the present disclosure.

Refer to FIG. 7 and FIG. 8. In this embodiment, the rear-view camera assembly 2 includes a fixed base 21, one end of the fixed base 21 is rotatably provided with a rear-view camera 22, and the other end of the fixed base 21 is provided with the stop lamp 23. The fixed base 21 is provided with two opposite mounting posts 24, two ends of the rear-view camera 22 each are provided with an adjustment shaft 25, and the adjustment shaft 25 is rotatably disposed on the mounting post 24. During adjustment, the rear-view camera 22 is rotated directly so that it can rotate around the adjustment shaft 25. In addition, a back side of the rear-view camera 22 is provided with a first circular arc plate, and the first plate is provided with a plurality of first slots 26. A first snap-fit bar 27 is disposed between the two mounting posts 24 on the fixed base 21, and the first snap-fit bar 27 is connected to any one of the first slots 26 in the snap-fit manner. After adjustment, the corresponding first slot 26 and first snap-fit bar 27 cooperate with each other to ensure stability of the rear-view camera 22.

Figure 9:
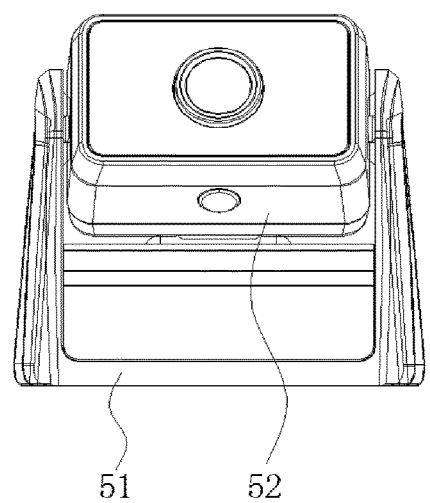
FIG. 9 is a front view of a reversing camera according to the present disclosure.
Figure 10:
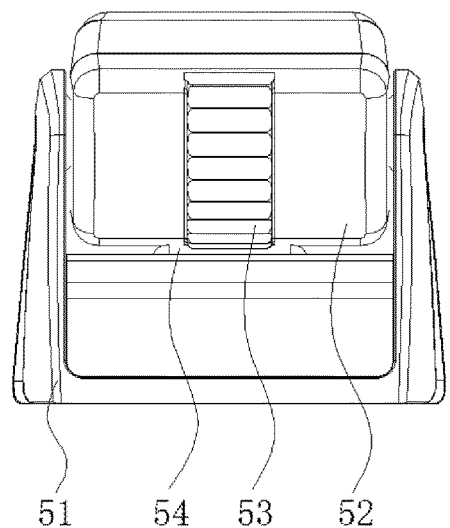
FIG. 10 is a rear view of a reversing camera according to the present disclosure.

Refer to FIG. 9 and FIG. 10. In this embodiment, the reversing camera 5 includes a bracket 51 and a camera body 52, two sides of the camera body 52 are disposed at an adjustable angle on the bracket 51, and a magnet is disposed at the bottom of the bracket 51. The magnet can be directly adsorbed onto or separated from the RV. This is simple and reliable. The bracket 51 includes a base and two connecting rods disposed at two ends of the base. The two sides of the camera body 52 are respectively connected to the connecting rods. A lower surface of the camera body 52 is provided with a second circular arc plate, and the second plate is provided with a plurality of second slots 53. A second snap-fit bar 54 is disposed between the two connecting rods on the base, and the second snap-fit bar 54 is connected to in any one of the second slots 53 in the snap-fit manner. The camera body 52 can be directly rotated if required. After the camera body 52 is adjusted to a proper position, the second snap-fit bar 54 is connected to the corresponding second slot 53 in the snap-fit manner, thereby ensuring stability of the camera body 52.

Figure 11:
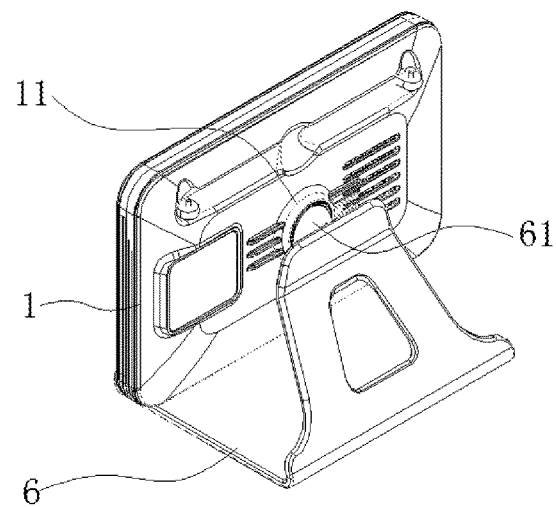
FIG. 11 is a schematic structural diagram of a connection between a display screen and a mounting rack according to the present disclosure.

Refer to FIG. 11. In this embodiment, the rear-view camera assembly 2, the side-view camera assembly 3, the door-top camera assembly 4, and the reversing camera 5 each are provided with a wireless transmitting module, and the display screen 1 is provided with a wireless receiving module for receiving a corresponding signal sent by the wireless transmitting module. In this way, the rear-view camera assembly 2, the side-view camera assembly 3, the door-top camera assembly 4, and the reversing camera 5 are wirelessly connected to the display screen 1. The display screen 1 is mounted on a mounting rack 6. The mounting rack 6 is disposed in a cab and a living region of the RV. The mounting rack 6 is provided with a splicing convex 61, the display screen 1 is provided with a splicing concave cavity 11 whose shape matches a shape of the splicing convex 61, and the splicing convex 61 is detachably inserted into the splicing concave cavity 11. During driving, the display screen 1 can be directly mounted on the mounting rack 6 in the cab. During a rest at night, the display screen 1 is mounted on the mounting rack 6 in the living region to monitor a situation outside the RV. The splicing convex 61 can be directly inserted into the splicing concave cavity 11.

The foregoing are merely descriptions of preferred implementations of the present disclosure. It should be noted that a person of ordinary skill in the art can make several improvements and replacements without departing from the principle of the present disclosure, and such improvements and replacements should be deemed as falling within the protection scope of the present disclosure.

What is claimed is:

1. A recreational vehicle (RV) monitoring system, comprising a display screen, and a rear-view camera assembly, a side-view camera assembly, a door-top camera assembly, and a reversing camera that are electrically connected to the display screen, wherein the display screen is detachably disposed inside an RV, the reversing camera is detachably disposed at a lower end of the tail of the RV, the rear-view camera assembly is mounted at a stop lamp of the RV, the door-top camera assembly is disposed on the top of a door of the RV, and the side-view camera assembly is disposed at a turn lamp of the RV;

wherein the door-top camera assembly comprises a mounting base, a door-top camera is disposed at an adjustable angle in the middle of the mounting base, and two sides of the door-top camera are respectively provided with a lighting lamp and a sensor for human body detection; and the mounting base comprises a mounting part and a connecting part for connecting to the door, two adapter plates are symmetrically disposed on the mounting part, two ends of the door-top camera are provided with a spindle, and the spindle is rotatably disposed inside the adapter plate;

wherein a back side of the door-top camera is provided with a circular arc snap-fit plate, and the snap-fit plate is provided with a plurality of slots; and a bar is disposed between the two adapter plates on the mounting part, and the bar is connected to any one of the slots in a snap-fit manner.

2. The RV monitoring system according to claim 1, wherein an included angle between a center line of a lens of the door-top camera and a horizontal plane is a, and a value of a ranges from 25 degrees to 35 degrees.

3. The RV monitoring system according to claim 1, wherein the side-view camera assembly comprises a base body, one end of the base body is rotatably provided with a side-view camera, and the other end of the base body is provided with the turn lamp.

4. The RV monitoring system according to claim 3, wherein the base body is provided with a rotating groove, two engaging lugs are oppositely disposed on the rotating groove, two ends of the side-view camera each are provided with a rotating shaft, and the rotating shaft is rotatably disposed inside the engaging lug.

5. He RV monitoring system according to claim 1, wherein the rear-view camera assembly comprises a fixed base, one end of the fixed base is rotatably provided with a rear-view camera, and the other end of the fixed base is provided with the stop lamp.

6. The RV monitoring system according to claim 5, wherein the fixed base is provided with two opposite mounting posts, two ends of the rear-view camera each are provided with an adjustment shaft, and the adjustment shaft is rotatably disposed on the mounting post.

7. The RV monitoring system according to claim 1, further comprising a mounting rack disposed in a cab and a living region of the RV, wherein the mounting rack is provided with a splicing convex, the display screen is provided with a splicing concave cavity whose shape matches a shape of the splicing convex, and the splicing convex is detachably inserted into the splicing concave cavity.

8. The RV monitoring system according to claim 1, wherein the reversing camera comprises a bracket and a camera body, two sides of the camera body are disposed at an adjustable angle on the bracket, and a magnet is disposed at the bottom of the bracket.

* * * * *